United States Patent [19]
Rogers

[11] Patent Number: 6,056,368
[45] Date of Patent: May 2, 2000

[54] SIDE DUMP BODY HAVING AN INCREASED CARRYING CAPACITY

[75] Inventor: Ralph R. Rogers, South Sioux City, Nebr.

[73] Assignee: Circle R, Inc., So. Sioux City, Iowa

[21] Appl. No.: 09/243,009

[22] Filed: Feb. 2, 1999

[51] Int. Cl.[7] .................................................. B60D 1/16
[52] U.S. Cl. ........................... 298/18; 298/17.5; 298/17.7
[58] Field of Search ........................... 298/11, 17.5, 17.6, 298/18

[56] References Cited

U.S. PATENT DOCUMENTS

| | | | |
|---|---|---|---|
| 899,108 | 9/1908 | Hansen . | |
| 1,311,644 | 7/1919 | Flom . | |
| 1,325,495 | 12/1919 | Lee . | |
| 1,539,492 | 3/1925 | Jefferis . | |
| 2,072,998 | 3/1937 | Allin | 298/18 |
| 2,530,613 | 11/1950 | Hopper | 298/18 |
| 3,019,054 | 1/1962 | Stahly | 298/18 |
| 3,238,897 | 3/1966 | Flowers | 105/276 |
| 3,323,838 | 6/1967 | Trucco et al. | 298/8 |
| 3,508,503 | 4/1970 | Daly | 105/367 |
| 3,753,593 | 8/1973 | Wells et al. | 298/10 |
| 3,844,617 | 10/1974 | Kostman | 298/1 |
| 4,200,334 | 4/1980 | Lindholm | 298/7 |
| 4,494,798 | 1/1985 | Bailey | 298/17.6 |
| 4,619,484 | 10/1986 | Maxey | 298/18 |
| 4,838,598 | 6/1989 | Hyde | 296/50 |
| 5,211,518 | 5/1993 | Mimica | 410/50 |
| 5,322,350 | 6/1994 | Hinson | 298/1 R |
| 5,480,214 | 1/1996 | Rogers | 298/17.6 |
| 5,597,211 | 1/1997 | Golden | 298/17.6 |
| 5,845,971 | 12/1998 | Rogers | 298/18 |
| 5,967,615 | 10/1999 | Rogers | 298/18 |

FOREIGN PATENT DOCUMENTS

| | | | |
|---|---|---|---|
| 2058661 | 3/1992 | Canada | 296/184 |
| WO89/02838 | 4/1989 | European Pat. Off. | 298/18 |

*Primary Examiner*—Stephen T. Gordon
*Assistant Examiner*—S. Carpenter
*Attorney, Agent, or Firm*—Zarley, McKee, Thomte Voorhees & Sease; Dennis L. Thomte

[57] ABSTRACT

A side dump body having an increased carrying capacity when compared to conventional side dump bodies with the side dump body being pivotally movable between transport, loading and dumping positions. The side dump body has an open upper end which is directed upwardly when the side dump body is in its transport position. When the side dump body is in its loading position, the open upper end of the side dump body is directed upwardly and laterally towards one side of the wheeled frame upon which the side dump body is pivotally mounted. When the side dump body is in its dumping position, the open upper end of the side dump body is directed laterally and downwardly from the side of the wheeled frame.

2 Claims, 6 Drawing Sheets

SIDE DUMP BODY HAVING AN INCREASED CARRYING CAPACITY

BACKGROUND OF THE INVENTION

1. Field of the Invention

This invention relates to a side dump body for a truck or trailer and more particularly to a side dump body which has an increased carrying capacity when compared to existing side dump bodies.

2. Description of the Related Art

Side dump bodies for use on trucks or trailers have become extremely popular in recent years since the introduction of the side dump trailer of applicant which is disclosed in U.S. Pat. No. 5,480,214. In applicant's original side dump trailer, the side dump body included a bottom wall having side walls extending upwardly and outwardly from the side edges thereof with the rearward and forward ends of the body being closed by a rear wall and a front wall, respectively. The side dump body of applicant's previous invention may be pivotally moved to either side of the truck or trailer to dump the contents of the side dump body. Although the side dump body of applicant's previous invention has met with great success, the side dump body thereof is somewhat limited in its carrying capacity due to the required shape of the dump body which enables the dump body to be moved to its dumping position. The dump body of applicant's previous invention may obviously be increased in height to increase its carrying capacity, but if the side walls thereof are extended to increase the carrying capacity thereof, the side dump body would exceed highway width restrictions.

SUMMARY OF THE INVENTION

A side dump body having an increased carrying capacity is disclosed wherein the side dump body is pivotally movably mounted on a wheeled frame of a truck or trailer. The side dump body of this invention includes a bottom wall having a first side wall extending substantially vertically upwardly from one side of the bottom wall and a second side wall extending upwardly and outwardly from the other side of the bottom wall. A third wall extends substantially vertically upwardly from the upper end of the second side wall. Front and rear walls close the front and rear ends of the body, respectively. The upper ends of the front and rear walls, the first side wall and the third side wall define an open upper end. Means is provided at the forward and rearward ends of the side dump body for pivotally moving the side dump body between a transport position, a loading position and a dumping position. The side dump body, when in its loading position, has its second side wall substantially horizontally disposed on the wheeled frame so that the open upper end of the side dump body is directed generally towards one side of the wheeled frame to facilitate the loading of material into the side dump body. The side dump body, when in its transport position, has its bottom wall substantially horizontally disposed on the wheeled frame. The side dump body, when in its dumping position, has its open upper end generally directed downwardly and laterally of the side of the wheeled frame to dump the material in the side dump body therefrom laterally of the side of the wheeled frame. The design of the side dump body is such that it has increased carrying capacity when compared to existing side dump bodies with the side dump body of this invention complying with highway width restrictions.

A principal object of the invention is to provide an improved side dump body.

Yet another object of the invention is to provide a side dump body for a truck or trailer wherein the side dump body has an increased carrying capacity.

Yet another object of the invention is to provide a side dump body wherein the side dump body may be selectively pivotally moved between transport, loading and dumping positions.

Yet another object of the invention is to provide a side dump body having an increased carrying capacity which complies with highway regulations.

These and other objects of the invention will be apparent to those skilled in the art.

DESCRIPTION OF THE PREFERRED EMBODIMENT

Figure 5:
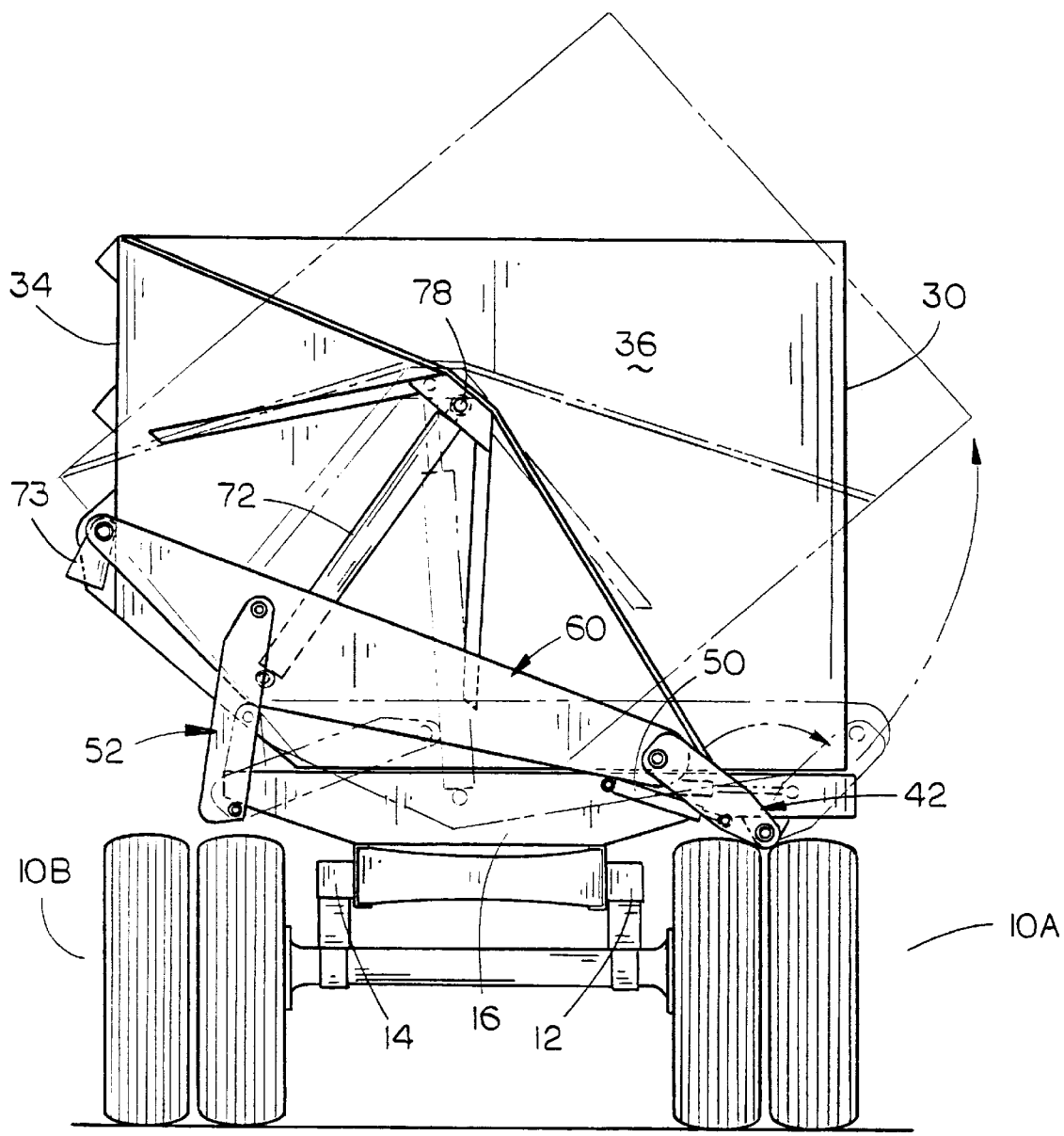
FIG. 5 is a rear elevational view of the side dump body with the solid lines showing the body in its transport position and the broken lines illustrating the body in its loading position.

The numeral 10 refers generally to a wheeled frame which may be a part of a truck or trailer. Wheeled frame 10 includes a pair of longitudinally extending frame members 12 and 14 having a plurality of cross members 16 positioned thereon and extending therebetween, as best seen in FIG. 5. For purposes of description, the wheeled frame 10 will be described as having sides 10A and 10B, a rearward end 18 and a forward end 20.

Figure 1:
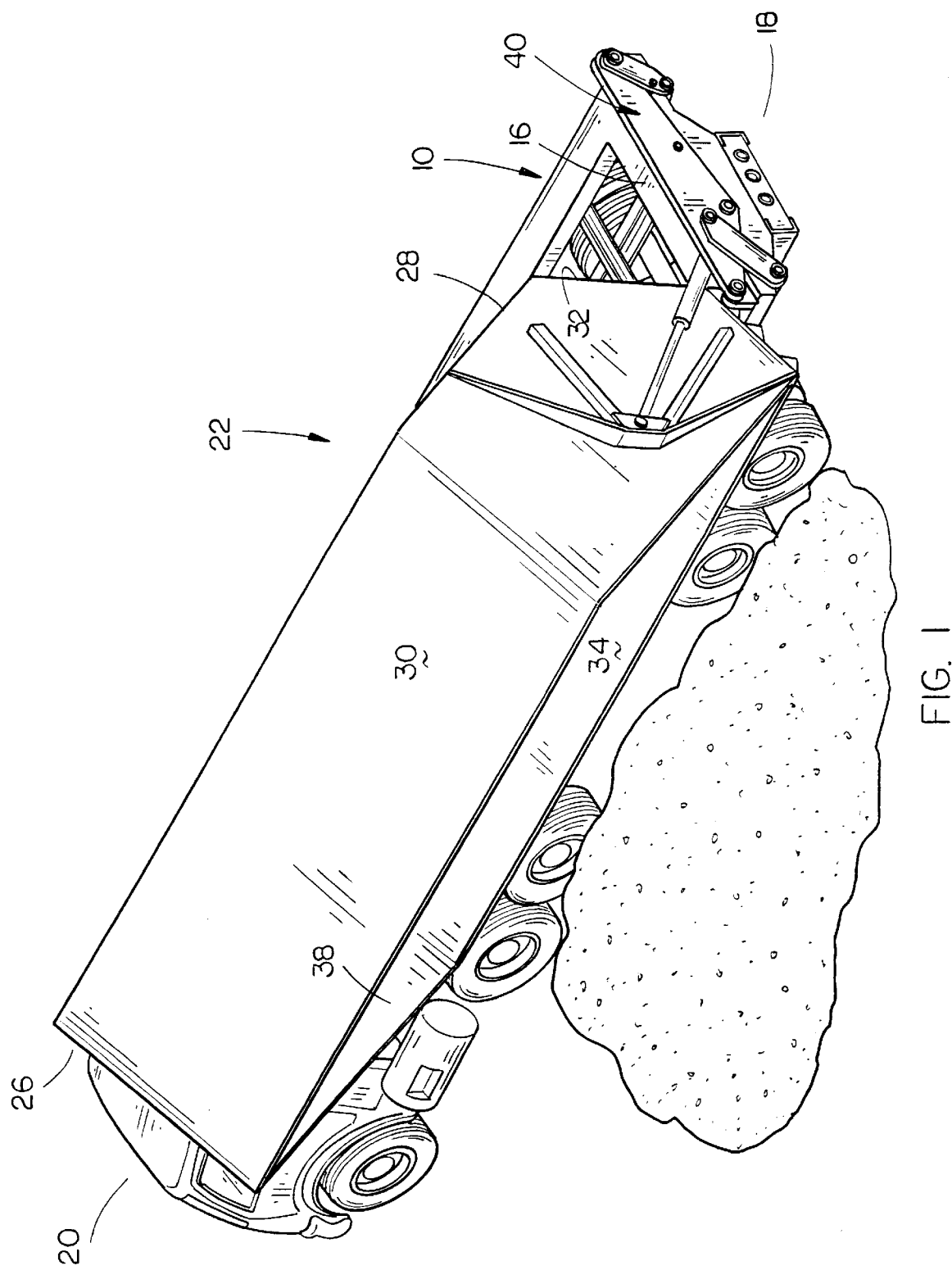
FIG. 1 is rear perspective view of the side dump body of this invention in a dumping position.
Figure 2:
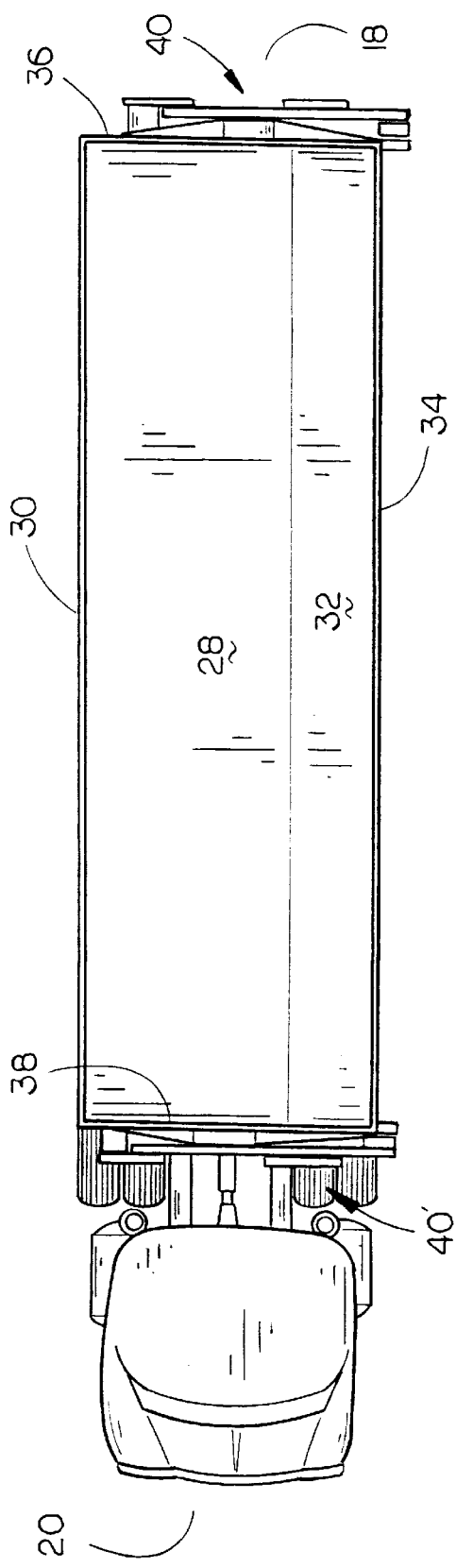
FIG. 2 is a top view of the side dump body of this invention.
Figure 3:
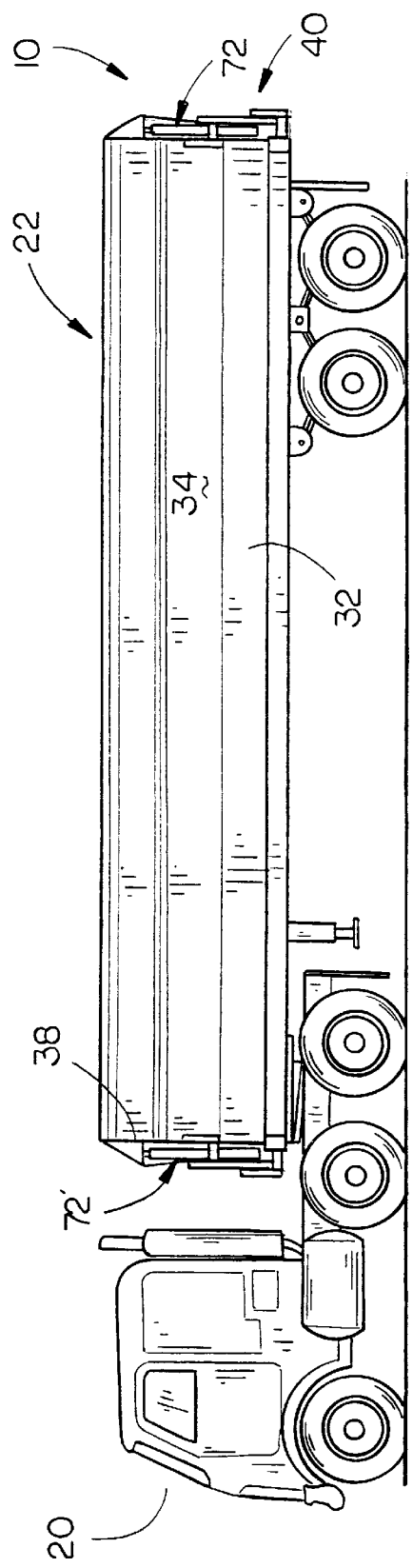
FIG. 3 is a side view of the side dump body of this invention.
Figure 4:
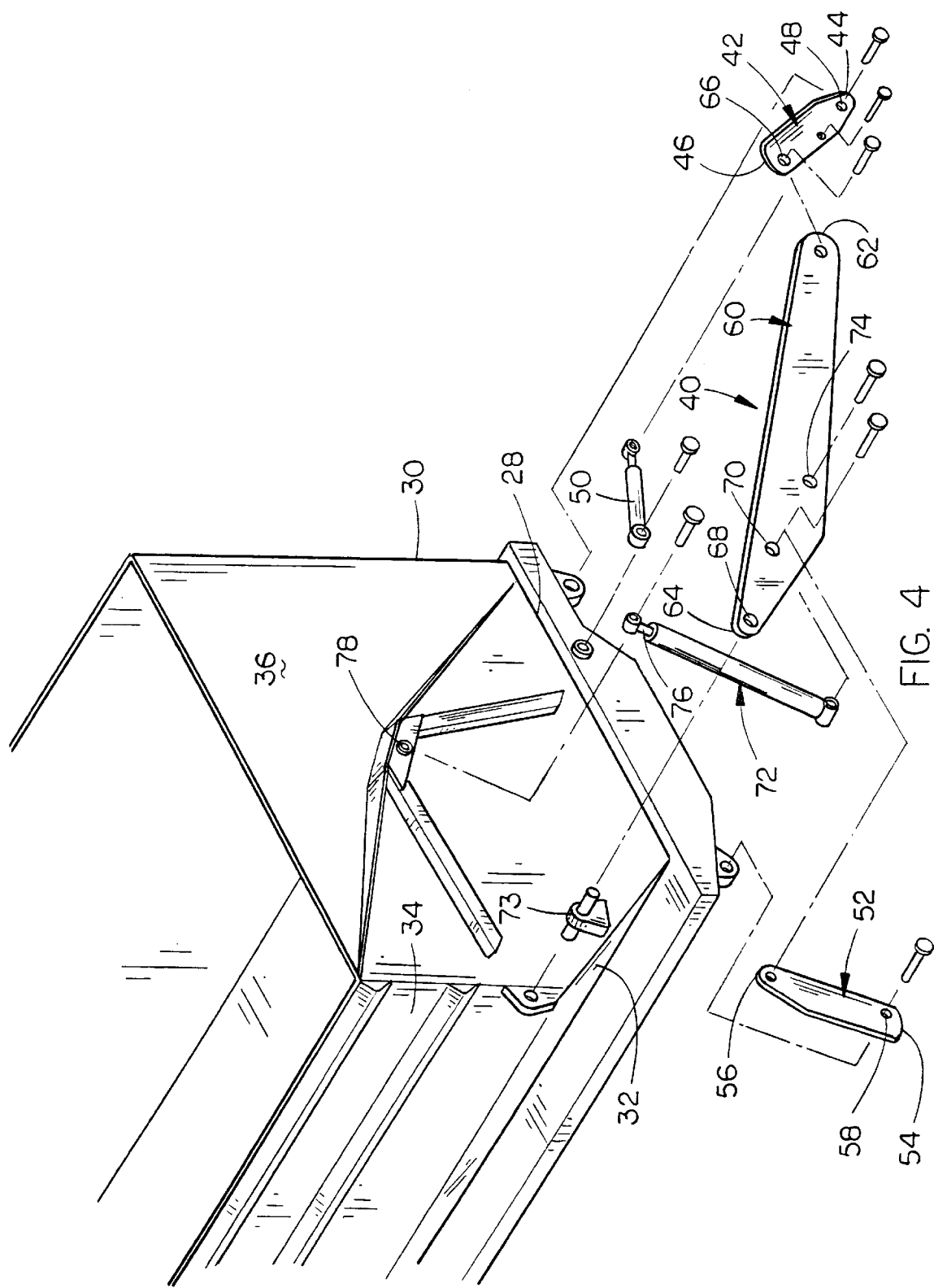
FIG. 4 is a partial rear exploded perspective view of the side dump body.

The side dump body of this invention is referred to generally by the reference numeral 22. For purposes of description, side dump body 22 will be described as having a rearward end 24 and a forward end 26. More specifically, side dump body 22 includes a bottom wall 28 having a first side wall 30 extending upwardly from one side thereof, as best seen in FIG. 4. Body 22 also includes a second side wall 32 which extends upwardly and outwardly from the other side of bottom wall 28. Body 22 further includes a third side wall 34 which extends upwardly from the upper outer end of second side wall 32. Side dump body 22 also includes a rear wall 36 and a front wall 38.

The numeral 40 refers generally to a body pivot assembly which is located at the rear of the dump body for moving the dump body as will be described in more detail hereinafter. The numeral 40' refers to a body pivot assembly located at the forward end of the dump body 22 and which is identical to body pivot assembly 40.

The numeral 42 refers to a first elongated rear link arm having a lower end 44 and an upper end 46. Rear link arm 42 is pivotally connected at its lower end 44 to the wheeled frame adjacent side 10A at 48. A first rear hydraulic cylinder 50 is pivotally secured to and extends between one of the cross members 16 and the rear link arm 42, as seen in the drawings.

The numeral 52 refers to a second elongated rear link arm having a lower end 54 and an upper end 56. The lower end of rear link arm 52 is pivotally connected to the cross member 16 at 58. The numeral 60 designates a third elongated rear link arm having ends 62 and 64, as seen in FIG. 4. End 62 of rear link arm 60 is pivotally connected to the upper end of rear link arm 42 at 66. The end 64 of rear link arm 60 is pivotally connected to side wall 34 at 68. The upper end of rear link arm 52 is pivotally connected to rear link arm 60 at 70. The lower end of a second rear hydraulic cylinder 72 is pivotally connected to rear link arm 60 at 74. The upper end of the cylinder shaft 76 of hydraulic cylinder 72 is pivotally connected to the rear wall 36 at 78. Stop 73 is provided at the pivotal connection of arm 60 with side wall 30 which is designed to engage cross member 16 (FIG. 6) to limit the pivotal movement of arm 60.

Figure 7:
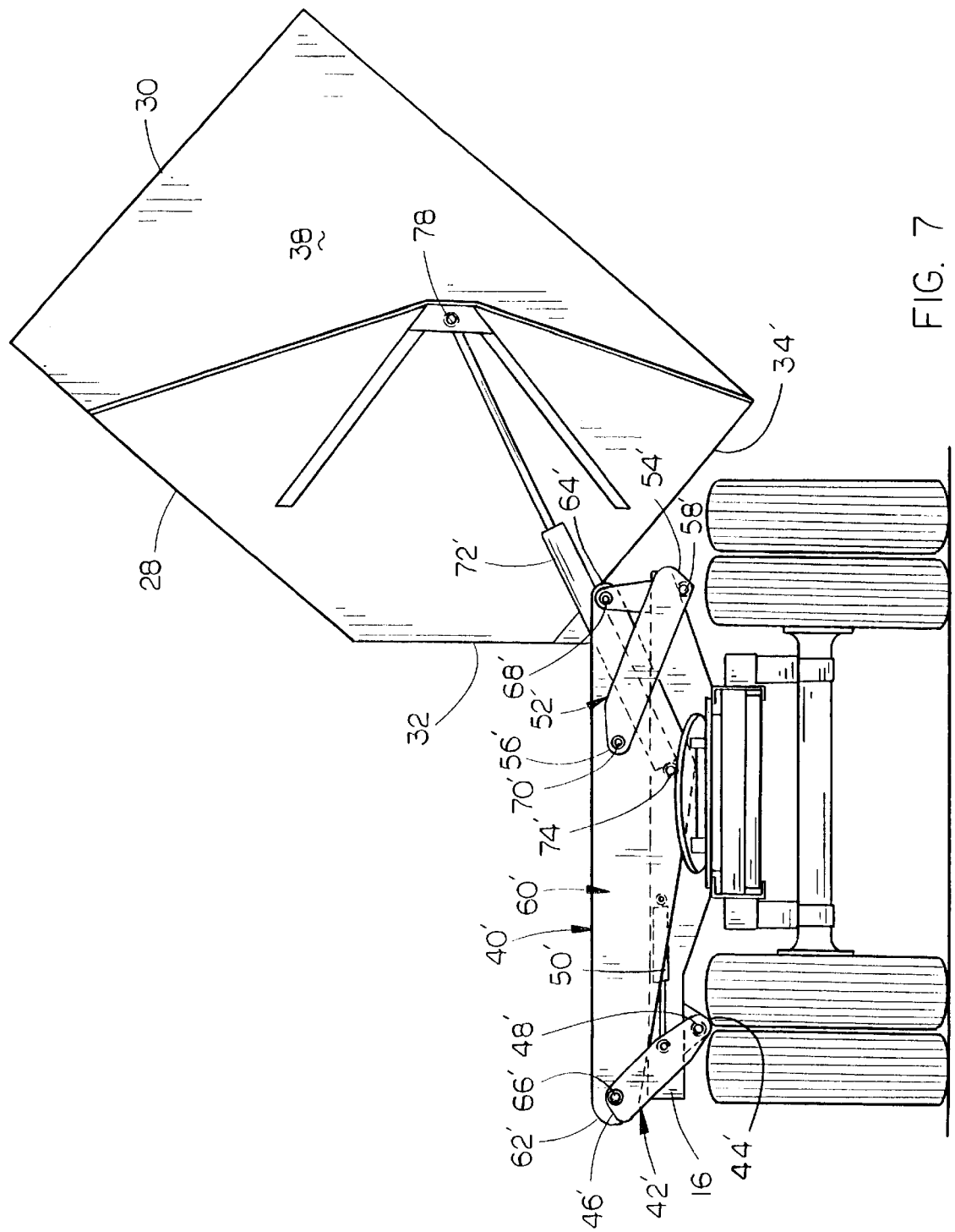
FIG. 7 is a front elevational view of the body in a dumping position.

The numeral 42' refers to a first elongated front link arm having a lower end 44' and an upper end 46'. Front link arm 42' is pivotally connected at its lower end to the wheeled frame adjacent side 10A at 48'. A first rear hydraulic cylinder 50' is pivotally secured to and extends between one of the cross members 16 and the front link arm 42', as seen in FIG. 7.

The numeral 52' refers to a second elongated front link arm having a lower end 54' and an upper end 56'. The lower end of front link arm 52' is pivotally connected to the cross member 16 at 58'. The numeral 60' refers to a third elongated front link arm having ends 62' and 64', as seen in FIG. 7. End 62' of front link arm 60' is pivotally connected to the upper end of front link arm 42' at 66'. The end 64' of front link arm 60' is pivotally connected to side wall 34' at 68'. The upper end 56' of front link arm 52' is pivotally connected to front link arm 60' at 70'. The lower end of a second front hydraulic cylinder 72' is pivotally connected to front link arm 60' at 74'. The upper end of the cylinder shaft 76' of hydraulic cylinder 72' is pivotally connected to the front wall 38' at 78'.

Figure 6:
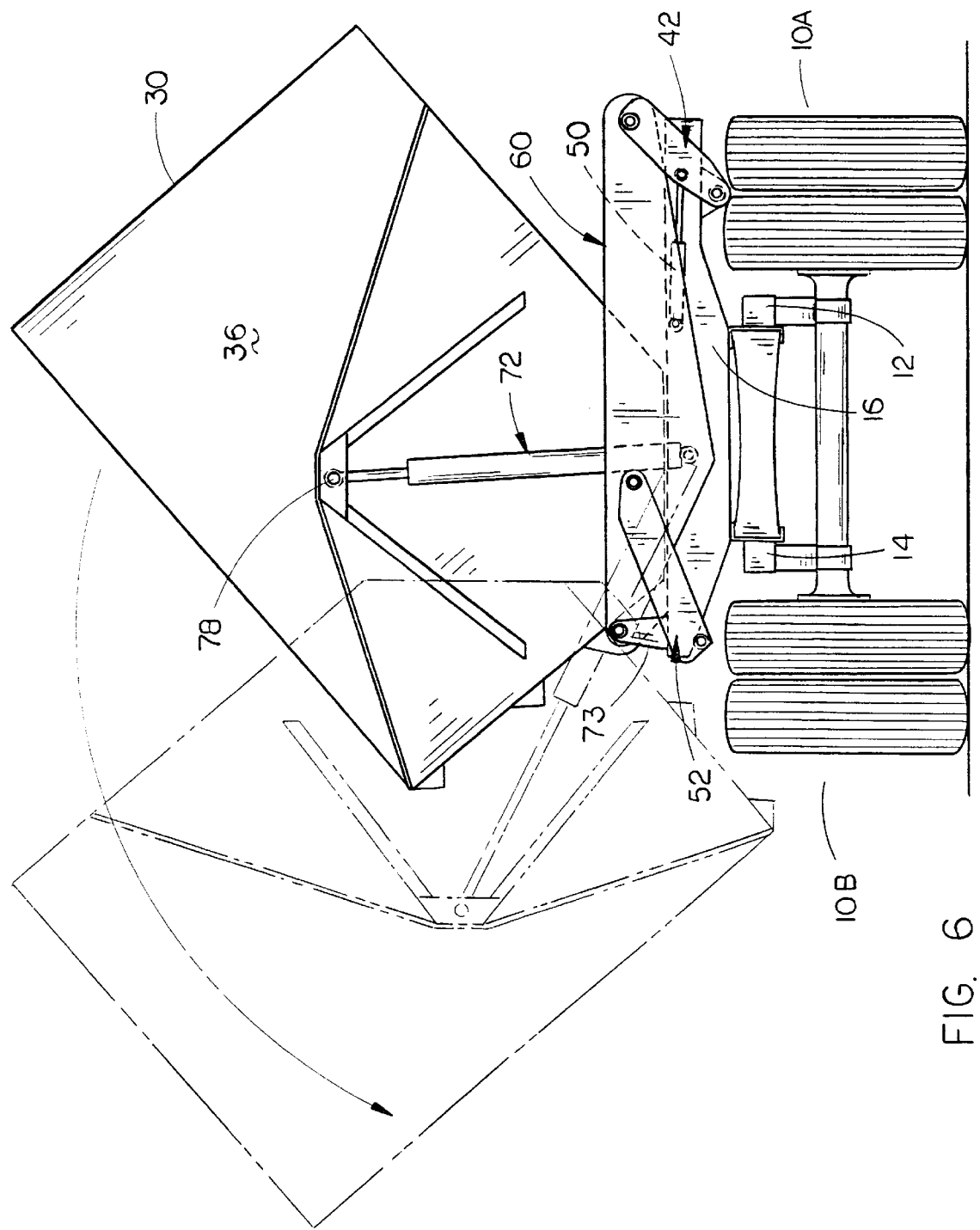
FIG. 6 is a rear elevational view of the body in its loading position with the broken lines illustrating the body in its dumping position.

The hydraulic cylinders 50, 72, 50' and 72' are adapted to pivot the side dump body from the running or transport position illustrated in solid lines in FIG. 5 to the solid line loading position of FIG. 6 and to the broken line dumping position of FIG. 6. When the side dump body is in the transport position, as illustrated in FIG. 5, bottom wall 28 is substantially horizontally disposed on the wheeled frame 10 as seen. When in its transport position, the open upper end of the dump body is directed upwardly.

The side dump body 22, when in its loading position, has its second side wall 32 substantially horizontally disposed on the wheeled frame 10 so that the open upper end of the side dump body is directed generally towards side 10B of the wheeled frame 10 to facilitate the loading of material into the side dump body.

The side dump body 22, when in its broken line dumping position of FIG. 6, is disposed so that the open upper end thereof is generally directed downwardly and laterally of side 10B to dump the material in the side dump body 22 therefrom laterally of side 10B of the wheeled frame 10.

It can therefore be seen that the configuration of the side dump body 22 is such that it has increased carrying capacity when compared to existing side dump bodies so that large loads may be carried with the truck or trailer complying with highway width regulations. Further, it can be seen that the side dump body of this invention may be positioned in a loading position, as illustrated by solid lines in FIG. 6, so that materials may be conveniently positioned therein. Once the side dump body 22 has been loaded, it is pivoted to the transport position of FIG. 5. When the truck or trailer reaches the dumping location, the side dump body 22 is pivotally moved from the solid line position of FIG. 5 to the broken line position of FIG. 6 to dump the materials therefrom.

Thus it can be seen that a novel side dump body having increased carrying capacity has been disclosed which accomplishes at least all of its stated objectives.

I claim:

1. In combination:

a wheeled frame having a forward end, a rearward end, a first side and a second side;

a side dump body movably mounted on said wheeled frame and having a rearward end, a forward end and an open upper end;

said side dump body including a bottom wall having first and second sides, a forward end and a rearward end; a first side wall extending substantially vertically upwardly from said first side of said bottom wall; a second side wall extending upwardly and outwardly from said second side of said bottom wall; a third side wall extending substantially vertically upwardly from the upper end of said second side wall; a rear wall secured to and extending between said bottom wall, said first side wall, said second side wall and said third side wall; a front wall secured to and extending between said bottom wall, said first side wall, said second side wall and said third side wall; the upper ends of said first side wall, said third side wall, said front wall and said rear wall defining the said open upper end of said side dump body;

a first elongated rear link arm having upper and lower ends;

said lower end of said first rear link arm being pivotally secured to said wheeled frame adjacent said first side thereof at the rearward end thereof;

a second elongated rear link arm having upper and lower ends;

said lower end of said second rear link arm being pivotally secured to said wheeled frame adjacent said second side thereof at the rearward end thereof;

a third elongated rear link arm having first and second ends;

said first end of said third rear link arm being pivotally secured to said upper end of said first rear link arm;

said third rear link arm being pivotally secured, intermediate its length, to said upper end of said second rear link arm;

said third rear link arm being pivotally secured to said third side wall;

a first rear hydraulic cylinder pivotally connected to and extending between said wheeled frame and said first rear link arm;

a second rear hydraulic cylinder pivotally connected to and extending between said third rear link arm and said rear wall;

a first elongated front link arm having upper and lower ends;

said lower end of said first front link arm being pivotally secured to said wheeled frame adjacent said first side thereof at the forward end thereof;

a second elongated front link arm having upper and lower ends;

said lower end of said second front link arm being pivotally secured to said wheeled frame adjacent said second side thereof at the forward end thereof;

a third elongated front link arm having first and second ends;

said first end of said third front link arm being pivotally secured to said upper end of said first front link arm;

said third front link arm being pivotally secured, intermediate its length, to said upper end of said second front link arm;

said third front link arm being pivotally secured to said third side wall;

a first front hydraulic cylinder pivotally connected to and extending between said wheeled frame and said first front link arm;

a second front hydraulic cylinder pivotally connected to and extending between said third front link arm and said front wall;

the actuation of said hydraulic cylinders enabling said side dump body to be selectively movably positioned in a loading position, a transport position and a dumping position;

said side dump body, when in its said loading position, having its said second side wall substantially horizontally disposed on said wheeled frame so that said open upper end of said side dump body is directed generally toward said second side of said wheeled frame to facilitate the loading of material into said side dump body;

said side dump body, when in its said transport position, having its said bottom wall substantially horizontally disposed on said wheeled frame;

said side dump body, when in its said dumping position, having its said open upper end generally directed downwardly and laterally of said second side of said wheeled frame to dump the material in said side dump body therefrom laterally of said second side of said wheeled frame.

2. In combination:

a wheeled frame having a forward end, a rearward end, a first side and a second side;

a side dump body movably mounted on said wheeled frame and having a rearward end, a forward end and an open upper end;

said side dump body including a bottom wall having first and second sides, a forward end and a rearward end; a first side wall extending substantially vertically upwardly from said first side of said bottom wall; a second side wall extending upwardly and outwardly from said second side of said bottom wall; a third side wall extending substantially vertically upwardly from the upper end of said second side wall; a rear wall secured to and extending between said bottom wall, said first side wall, said second side wall and said third side wall; a front wall secured to and extending between said bottom wall, said first side wall, said second side wall and said third side wall; the upper ends of said first side wall, said third side wall, said front wall and said rear wall defining the said open upper end of said side dump body;

a first hydraulically operated linkage pivotally connected to and extending between said rearward end of said side dump body and said wheeled frame;

a second hydraulically operated linkage pivotally connected to and extending between said forward end of said side dump body and said wheeled frame;

the actuation of said first and second hydraulically operated linkages enabling said side dump body to be selectively movably positioned in a loading position, a transport position and a dumping position;

said side dump body, when in its said loading position, having its said second side wall substantially horizontally disposed on said wheeled frame so that said open upper end of said side dump body is directed generally toward said second side of said wheeled frame to facilitate the loading of material into said side dump body;

said side dump body, when in its said transport position, having its said bottom wall substantially horizontally disposed on said wheeled frame;

said side dump body, when in its said dumping position, having its said open upper end generally directed downwardly and laterally of said second side of said wheeled frame to dump the material in said side dump body therefrom laterally of said second side of said wheeled frame.

* * * * *